(12) United States Patent
Basit

(10) Patent No.: US 9,669,487 B2
(45) Date of Patent: Jun. 6, 2017

(54) ELECTRICAL CONTACT FOR MIG WELDING TORCH

(71) Applicant: Nauman Basit, Windsor, CA (US)

(72) Inventor: Nauman Basit, Windsor, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 349 days.

(21) Appl. No.: 14/534,408

(22) Filed: Nov. 6, 2014

(65) Prior Publication Data

US 2016/0129523 A1    May 12, 2016

(51) Int. Cl.
| | |
|---|---|
| *B23K 9/10* | (2006.01) |
| *B23K 9/28* | (2006.01) |
| *B23K 9/32* | (2006.01) |
| *H01R 13/00* | (2006.01) |
| *H01R 13/187* | (2006.01) |
| *H01R 9/11* | (2006.01) |

(52) U.S. Cl.
CPC ............. *B23K 9/32* (2013.01); *B23K 9/10* (2013.01); *H01R 13/005* (2013.01); *H01R 13/187* (2013.01); *H01R 9/11* (2013.01)

(58) Field of Classification Search
CPC ............. B23K 9/10; B23K 9/32–9/323; H01R 13/005; H01R 13/025; H01R 13/08; H01R 13/15–13/187; H01R 9/11
USPC ..................... 219/137.31–137.63
See application file for complete search history.

(56) References Cited

U.S. PATENT DOCUMENTS

| | | | | |
|---|---|---|---|---|
| 3,596,049 A | * | 7/1971 | Ogden .................. | B23K 9/295 219/136 |
| 5,260,546 A | * | 11/1993 | Ingwersen ............. | B23K 9/295 219/137.31 |
| 6,025,574 A | * | 2/2000 | Colangelo, Jr. ........ | B23K 9/295 200/43.17 |

* cited by examiner

*Primary Examiner* — Sang Y Paik
(74) *Attorney, Agent, or Firm* — Fildes & Outland, P.C.

(57) ABSTRACT

A contactor providing for electrical contact in a welding torch includes a body member having first and second opposite sides, and adjacent pivot and head portions. The pivot portion has an outwardly curved contact surface on the second side providing a pivot point. The head portion also has a contact surface on the second side. The pivot portion has a shorter length between the first and second sides than the head portion. The contactor may be pivotally mounted in a torch connector body. At least one resilient member urges the contact surface of the pivot portion into engagement with an inner flange surface of the connector body, and biases the head portion into an opening in the torch connector body. The contact surface of the head portion is engageable with a torch neck inserted into the torch connector body, and provides an electrical connection between the torch body and neck.

15 Claims, 5 Drawing Sheets

ELECTRICAL CONTACT FOR MIG WELDING TORCH

TECHNICAL FIELD

This disclosure relates to MIG welding torch systems/and more particularly to a connector for connecting an interchangeable neck to a torch body of a welding torch.

BACKGROUND OF THE INVENTION

Robotic MIG welding is a rapidly evolving field with numerous applications in the automotive and heavy industry sectors. It is known in the art relating to welding that an easily changeable neck provides end users with the capability of using the same welding robot for multiple parts or weld programs. Conventional welding torches include a screw which releasably clamps a neck to a connector body of the welding torch. The connector body is mounted on the arm of the welding robot, and is connected to a feeder which supplies consumable welding wire and inert gas to the welding torch. However, the fatigue cycling of the screw and clamp components, along with the human interface with the welding torch necessary to change the torch neck, are drawbacks to such conventional neck connectors.

SUMMARY OF THE INVENTION

Disclosed is a quick-change connector for connecting a neck to a torch body of a welding torch, the connector including a contactor that electrically connects the neck to a connector body of the welding torch while holding the neck in the torch connector body.

More particularly, a contactor for providing electrical contact in a welding torch includes a body member having first and second opposite sides, and adjacent pivot and head portions. The pivot portion has an outwardly curved contact surface on the second side, the contact surface of the pivot portion providing a pivot point. The head portion also has a contact surface on the second side. The pivot portion has a shorter length between the first and second sides than a length between the first and second sides in the head portion.

At least one resilient member may be engaged with the first side of the body member, and the contactor may include two resilient members. The body member may include a recess in the first side for receiving each of the resilient members. Each resilient member may be a helical spring. One of the resilient members may have a higher spring force than the other of the resilient members. The resilient member having a higher spring force engages the head portion of the body member and the other resilient member engages the pivot portion of the body member.

The contact surface of the head portion may be curved inwardly. The body member may include a chamfer on the second side between the curved contact surface of the pivot portion and the contact surface of the head portion.

A welding torch includes a torch body and an interchangeable neck insertable into the torch body. The contactor is disposed and pivotally mounted in the torch body. The contact surface of the head portion is engageable with the torch neck that is inserted into the welding torch at the connector body. The at least one resilient member urges the contact surface of the pivot portion into engagement with an inner flange surface of the torch body, and biases the head portion into an opening in the torch body. The contact surface of the head portion provides an electrical connection between the body member and the torch neck, and the contact surface of the pivot portion provides an electrical connection between the body member and the torch body, and holds the neck in the torch body.

These and other features and advantages of the device will be more fully understood from the following detailed description of the invention taken together with the accompanying drawings.

DETAILED DESCRIPTION OF THE INVENTION

Figure 3:
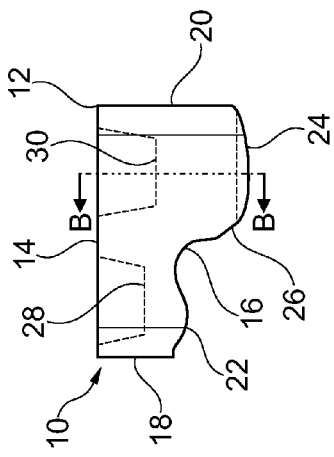
FIG. 3 is a side view of the contactor.

Referring now to the drawings in detail, numeral 10 generally indicates a contactor for providing electrical contact in a welding torch. The contactor 10 holds a welding torch neck in a welding torch connector body, and also provides an electrical contact between the connector body and the neck that is capable of passing more than 600 amperes of current between the connector body and the welding torch neck. The contactor 10 ensures a reliable electrical contact each time a welding torch neck is inserted into the connector body.

Figure 2:
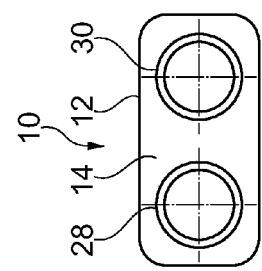
FIG. 2 is a plan view of the contactor.
Figure 1:
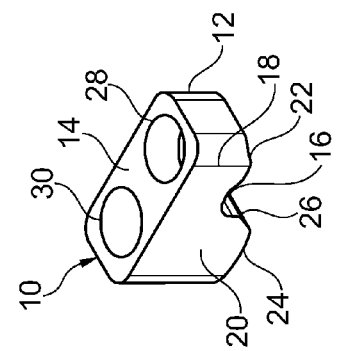
FIG. 1 is a perspective view of a contactor for a welding torch.
Figure 6:
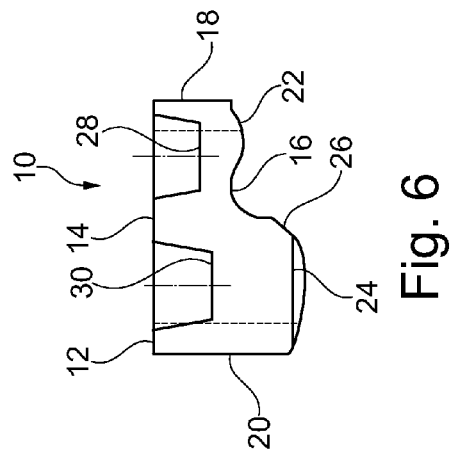
FIG. 6 is a cross-sectional view of the contactor taken along the line A-A in FIG. 5.
Figure 5:
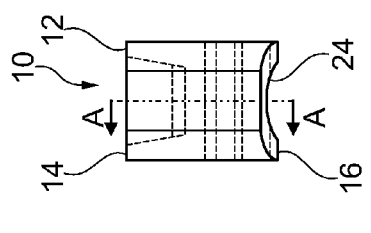
FIG. 5 is another side view of the contactor.
Figure 4:
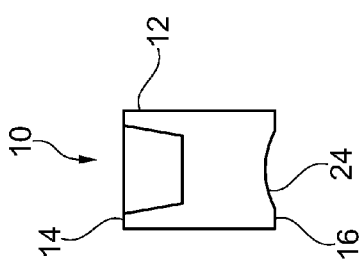
FIG. 4 is a cross-sectional view of the contactor taken along the line B-B in FIG. 3.
Figure 7:
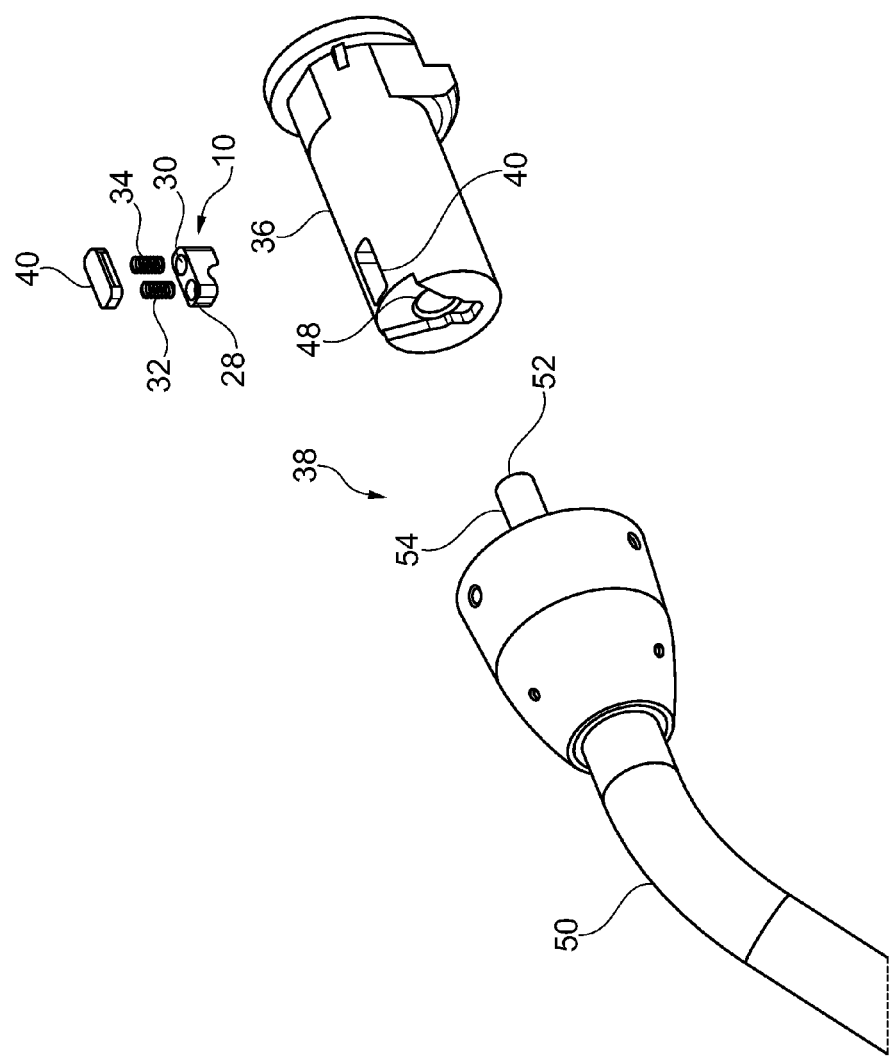
FIG. 7 is an exploded perspective view of a welding torch neck and welding torch body including the contactor.

Turning first to FIGS. 1-7, the contactor 10 includes a generally L-shaped body member 12 formed of a conductive material such as copper or similar. The body member 12 has a first side 14 and an opposite second side 16. The body member 12 also has a pivot portion 18 and an adjacent head portion 20. The pivot portion 18 is thinner (has a shorter length between the first and second sides 14, 16) than the thicker head portion (which has a greater length between the first and second sides 14, 16 relative to the pivot portion). The pivot portion 18 has an outwardly curved, convex contact surface 22 on the second side 16 that provides a pivot point and functions as a roller pin. At the other end of the second side 16, the head portion 20 has an inwardly curved, concave contact surface 24. The body member 12 also includes a chamfer 26 on the second side 16 defined by an angled surface disposed between the contact surface 22 of the pivot portion 18 and the contact surface 24 of the head portion 20.

In one embodiment, the body member 12 includes first and second recesses 28, 30 in the first side 14. A first resilient member 32 is received in the first recess 28 and a second resilient member 34 is received in the second recess 30. The resilient members 32, 34 are helical springs that engage the first side 14 of the body member 12. However, the resilient members may be any other similar compressible, elastic members that are capable of storing mechanical energy and applying a force. The first resilient member 32 has a higher spring force than the second resilient member 34. The first resilient member 32 having the higher spring force engages the pivot portion 18 and the second resilient member 34 having the lower spring force engages the head portion 20.

In an alternative embodiment, the contactor may include only a single resilient member such as a leaf spring or other similar force applying member that simultaneously urges both the pivot portion and the head portion.

Figure 8:
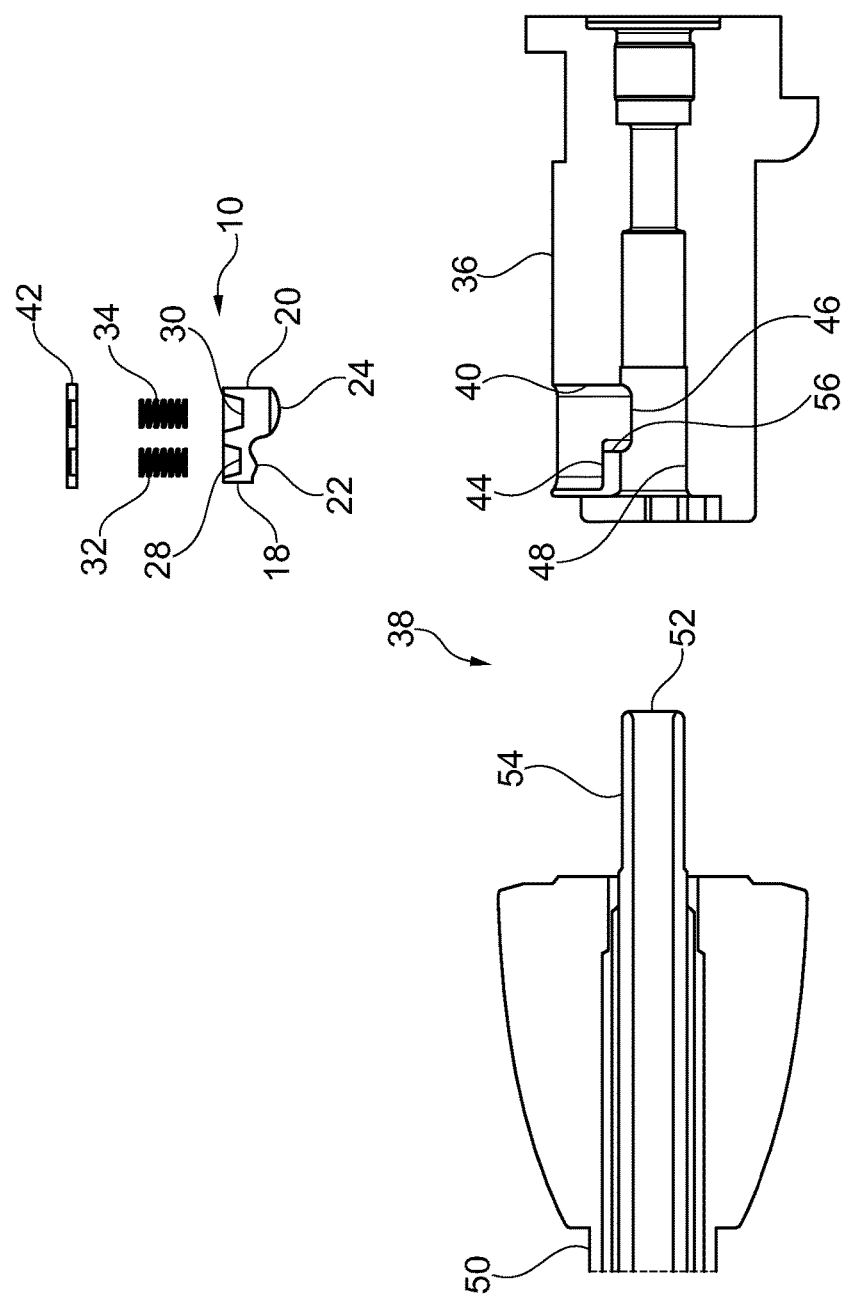
FIG. 8 is an exploded, sectional side view of the welding torch neck and welding torch body including the contactor.
Figure 9:
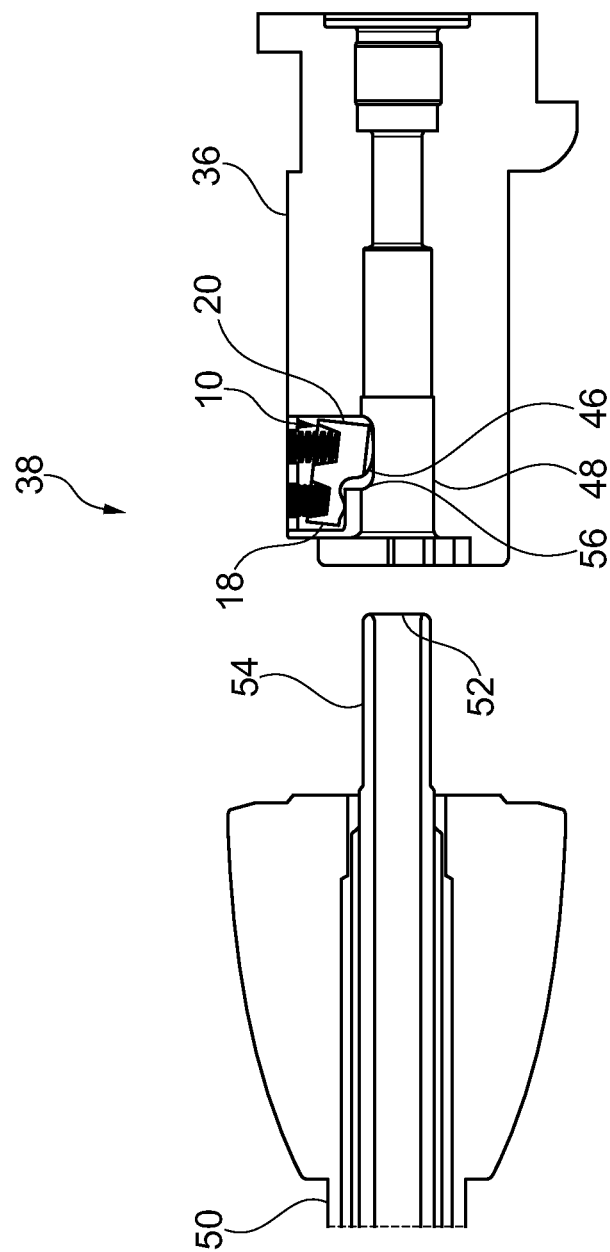
FIG. 9 is an environmental, sectional side view of the welding torch neck and welding torch body including the contactor illustrating the welding torch neck removed from the welding torch body.
Figure 10:
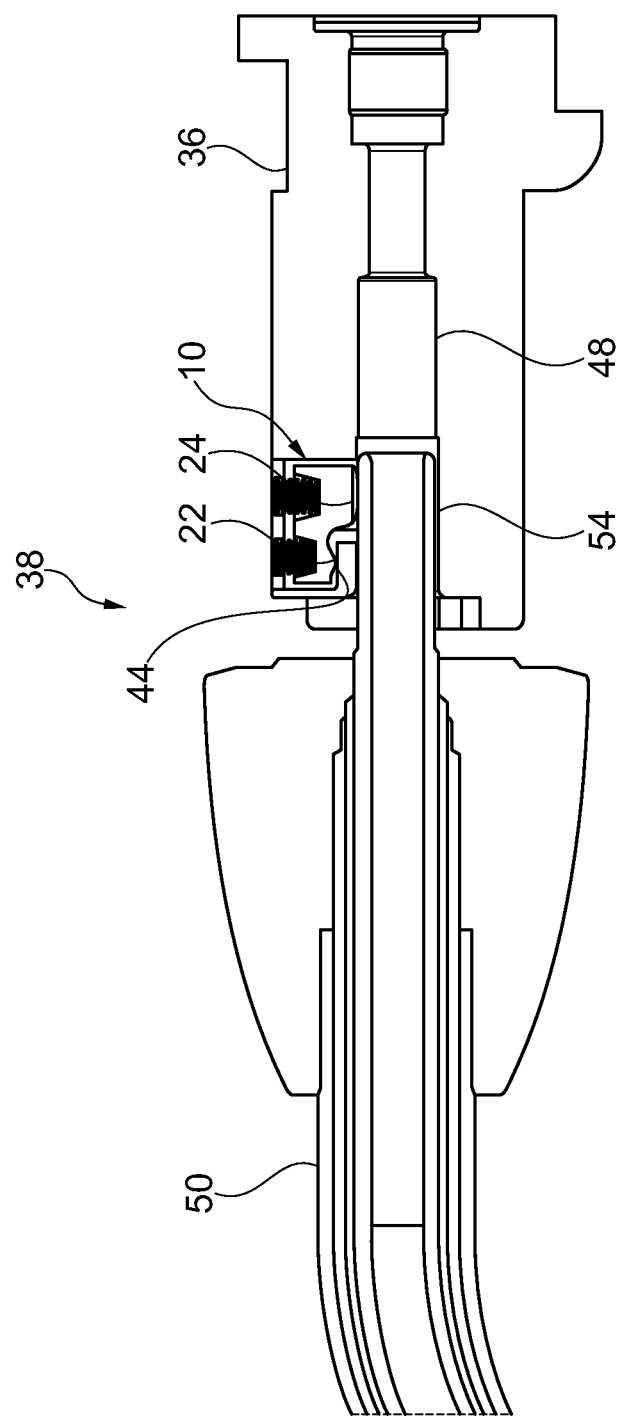
FIG. 10 is an environmental, sectional side view of the welding torch neck and welding torch body including the contactor illustrating the welding torch, neck received in the welding torch body and held by the contactor.

With reference to FIGS. 1 and 7-10, the contactor 10 is pivotally mounted in a torch connector body 36 of a welding torch 38. The contactor 10 is disposed in a recess 40 of the connector body 36. A cover plate 42 enclosing the recess engages outer ends of the first and second resilient members 32, 34 such that first resilient member urges the contact surface 22 of the pivot portion 18 into engagement with an inner flange surface 44 of the connector body 36, and the second resilient member biases the head portion 20 into an opening 46 within the connector body 36. The opening 46 is in fluid communication with a throughbore 48 of the connector body in which a welding torch neck 50 is received.

A connecting end 52 of the welding torch neck 50 includes a tubular connector 54 that is insertable and receivable in the throughbore 48 of the torch connector body 36. When the connector 54 of the neck 50 is inserted into the throughbore 48 of the torch body 36, the connector contacts the chamfer 26 of the contactor 10. The connector 54 slides along the surface of the chamfer 26, causing the contactor 10 to pivot in a direction away from the neck 50 (counterclockwise as seen in the drawings) and to compress the second resilient member 34. As the connector 54 of the neck 50 slides past the chamfer 26, the contact surface 24 of the head portion 20 of the contactor 10 engages the connector of the neck. The spring force of the second resilient member 34 urges the contact surface 24 of the head portion. 20 into engagement with the connector 54 of the neck 50, while the first resilient member 32 maintains the engagement of the pivot portion 18 of the contactor 10 with the connector body 36. The inwardly curved shape of the head portion contact surface 24 provides greater contact surface area with the neck 50 than a flat surface. The contact between the head portion 20 and the neck 50 holds the neck in the torch connector body 36 and provides an electrical connection between the body member 12 of the contactor 10 and the neck. Simultaneously, the contact between the pivot portion 18 and the torch connector body 36 provides an electrical connection between the body member 12 of the contactor 10 and the connector body. Thus, the contactor 10 provides an electrical connection between the neck 50 and the torch connector body 36, and the dynamic contact provided by the spring-loaded contactor 10 automatically adjusts to variations (tolerances) in the assembly to ensure that a reliable electrical connection is maintained.

The contactor 10 also facilitates changing of the welding torch neck 50. Conventionally, a welding torch neck is held in the torch connector body by a screw. In this conventional arrangement, changing of the welding torch neck required unscrewing the set screw. In contrast, the contactor 10 simply allows the welding torch neck 50 to be pulled out of throughbore 48 in the torch connector body 36. When the neck 50 is removed from the torch body, the second resilient member 34 expands and urges the head portion 20 of the contactor 10 into the throughbore 48. The pivotal motion of the contactor 10 is only limited by an edge (stop) 56 of the inner flange 44 in the connector body 36. Then, when a new neck is inserted into the connector body 36, the contactor 10 pivots back into the recess in the connector body. The contactor 10 thus functions like a rocker arm, pivoting when various torch necks are inserted or removed from the torch body, and provides easy changeout of the welding torch neck, allowing for use of the welding torch for a variety of different applications.

Although the device has been described by reference to specific embodiments, it should be understood that numerous changes may be made within the spirit and scope of the inventive concepts described. Accordingly, it is intended that the device not be limited to the described embodiments, but that it have the full scope defined by the language of the following claims.

What is claimed is:

1. A contactor providing for electrical contact in a welding torch, said contactor comprising:
    a body member having first and second opposite sides, and adjacent pivot and head portions;
    said pivot portion having an outwardly curved contact surface on said second side, said contact surface of said pivot portion providing a pivot point;
    said head portion having a contact surface on said second side;
    said pivot portion having a shorter length between said first and second sides than a length between said first and second sides in said head portion; and
    two resilient members engaged with said first side of said body member, wherein one of said resilient members has a higher spring force than the other of said resilient members, and said resilient member having a higher spring force engages said head portion of said body member and the other resilient member engages said pivot portion of said body member.

2. The contactor of claim 1, wherein said body member includes a recess in said first side for receiving said resilient member.

3. The contactor of claim 1, wherein said resilient member is a helical spring.

4. The contactor of claim 1, wherein said contact surface of said head portion is curved inwardly.

5. The contactor of claim 1, wherein said body member includes a chamfer on said second side between said curved contact surface of said pivot portion and said contact surface of said head portion.

6. A contactor for connecting a welding torch neck to a connector body of a welding torch, the contactor comprising:
    a body member pivotally mounted in said connector body of said welding torch;
    said body member having first and second opposite sides, and adjacent pivot and head portions;
    said pivot portion having an outwardly curved contact surface on said second side, said contact surface of said pivot portion providing a pivot point;
    said head portion having a contact surface on said second side, said contact surface being engageable with a torch neck inserted into said welding torch at said connector body; and
    at least one resilient member contacting said first side of said body member;
    said at least one resilient member urging said contact surface of said pivot portion into engagement with an inner flange surface of said connector body, and biasing said head portion into an opening in said connector body;

wherein said contact surface of said head portion provides an electrical connection between said body member and said torch neck, and said contact surface of said pivot portion provides an electrical connection between said body member and said connector body.

7. The contactor of claim 6, wherein said resilient member is a helical spring.

8. The contactor of claim 6, wherein said contactor includes two resilient members.

9. The contactor of claim 8, wherein one of said resilient members has a higher spring force than the other of said resilient members.

10. The contactor of claim 9, wherein said resilient member having a higher spring force contacts said pivot portion of said body member and the other resilient member contacts said head portion of said body member.

11. The contactor of claim 6, wherein said body member includes a recess in said first side for receiving said resilient member.

12. The contactor of claim 6, wherein said contact surface of said head portion is curved inwardly.

13. The contactor of claim 6, wherein said body member includes a chamfer on said second side between said curved contact surface of said pivot portion and said contact surface of said head portion.

14. The contactor of claim 6, wherein said pivot portion has a shorter length between said first and second sides than said head portion.

15. A welding torch comprising:

a torch body and an interchangeable neck insertable into said torch body;

a contactor disposed in said torch body, said contactor including:

a body member pivotally mounted in said torch body;

said body member having first and second opposite sides, and adjacent pivot and head portions;

said pivot portion having an outwardly curved contact surface on said second side, said contact surface of said pivot portion providing a pivot point;

said head portion having a contact surface on said second side, said contact surface being engageable with a torch neck inserted into said welding torch at said connector body; and at least one resilient member engaging said first side of said body member;

said at least one resilient member urging said contact surface of said pivot portion into engagement with an inner flange surface of said torch body, and biasing said head portion into an opening in said torch body;

wherein said contact surface of said head portion provides an electrical connection between said body member and said torch neck, and said contact surface of said pivot portion provides an electrical connection between said body member and said torch body, and holds said neck in said torch body.

\* \* \* \* \*